No. 686,099. Patented Nov. 5, 1901.
A. C. MATHER.
MOTOR ROAD VEHICLE.
(Application filed Nov. 28, 1899.)
(No Model.) 12 Sheets—Sheet 5.
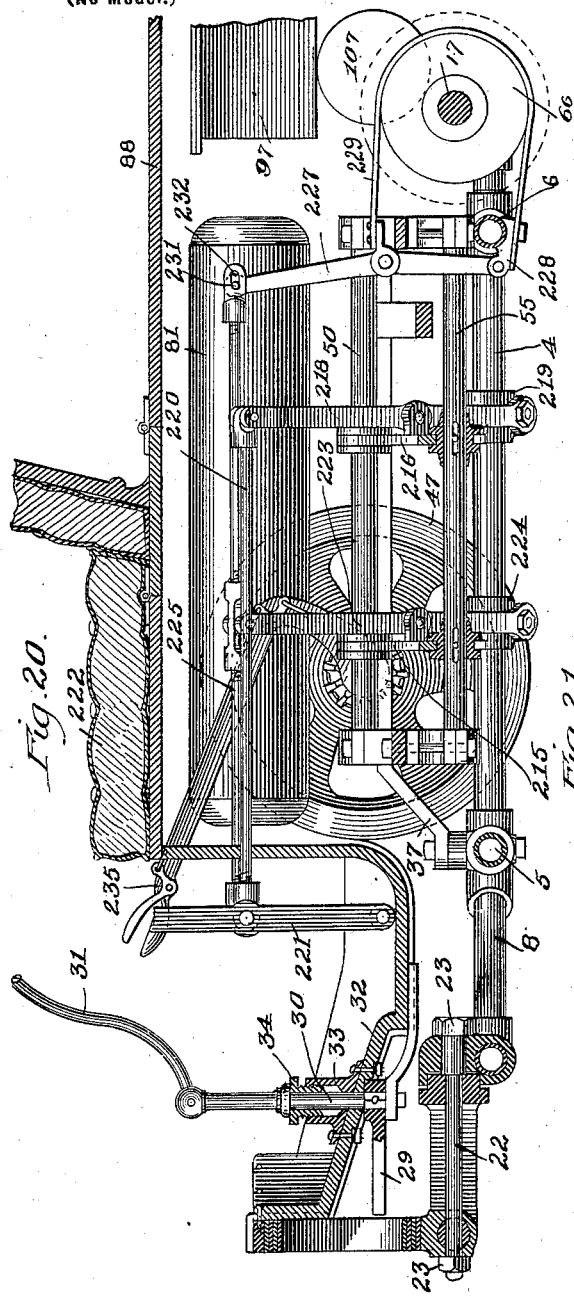
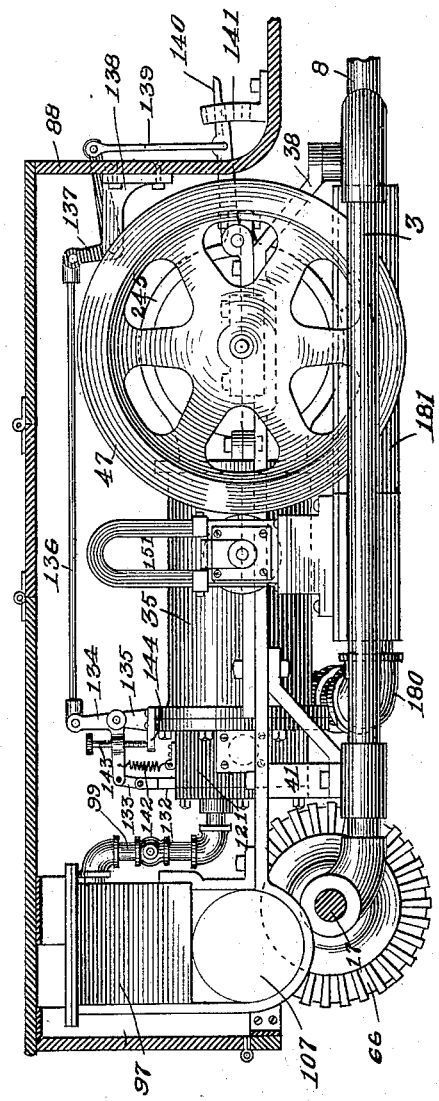
Witnesses: Inventor:

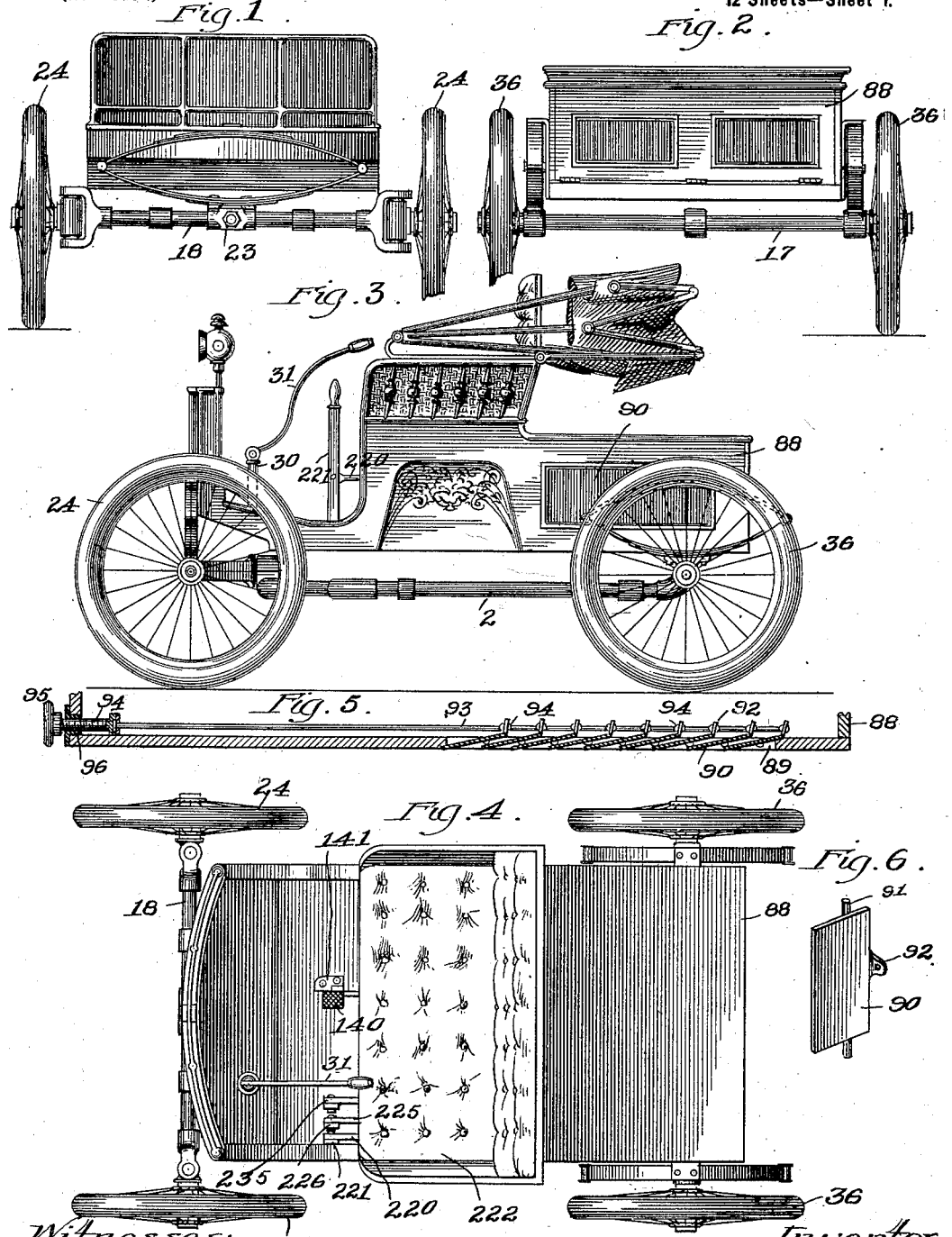

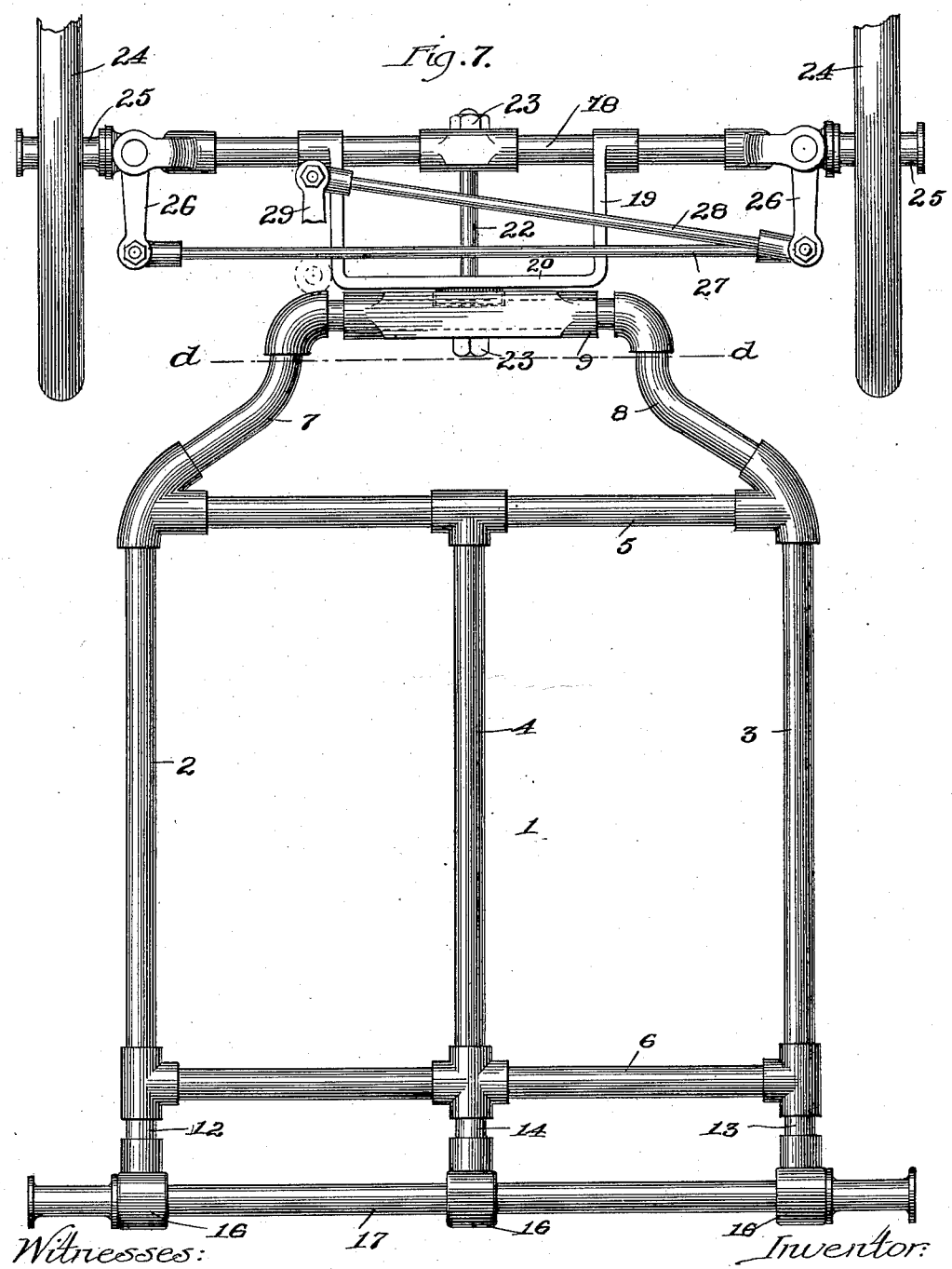

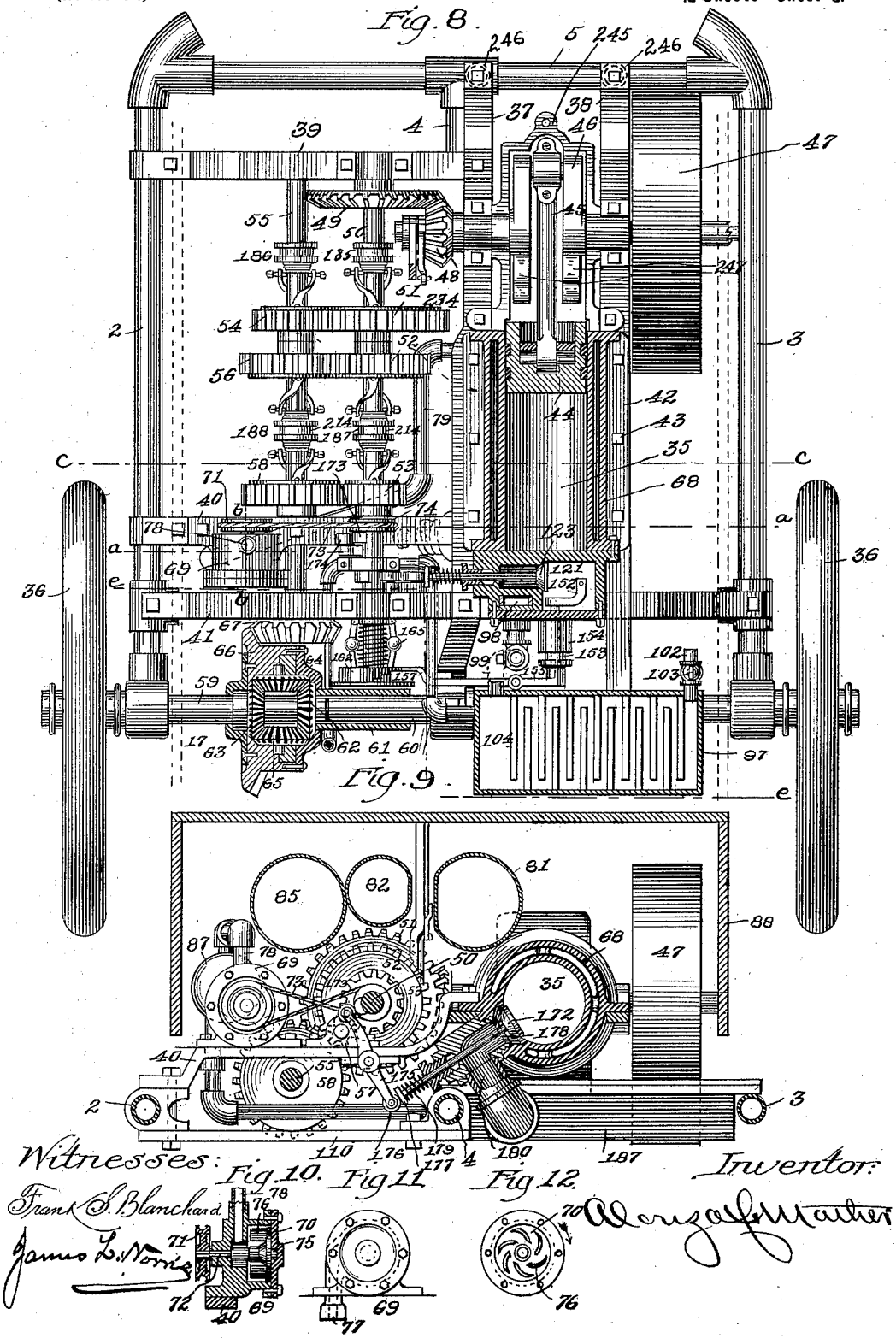

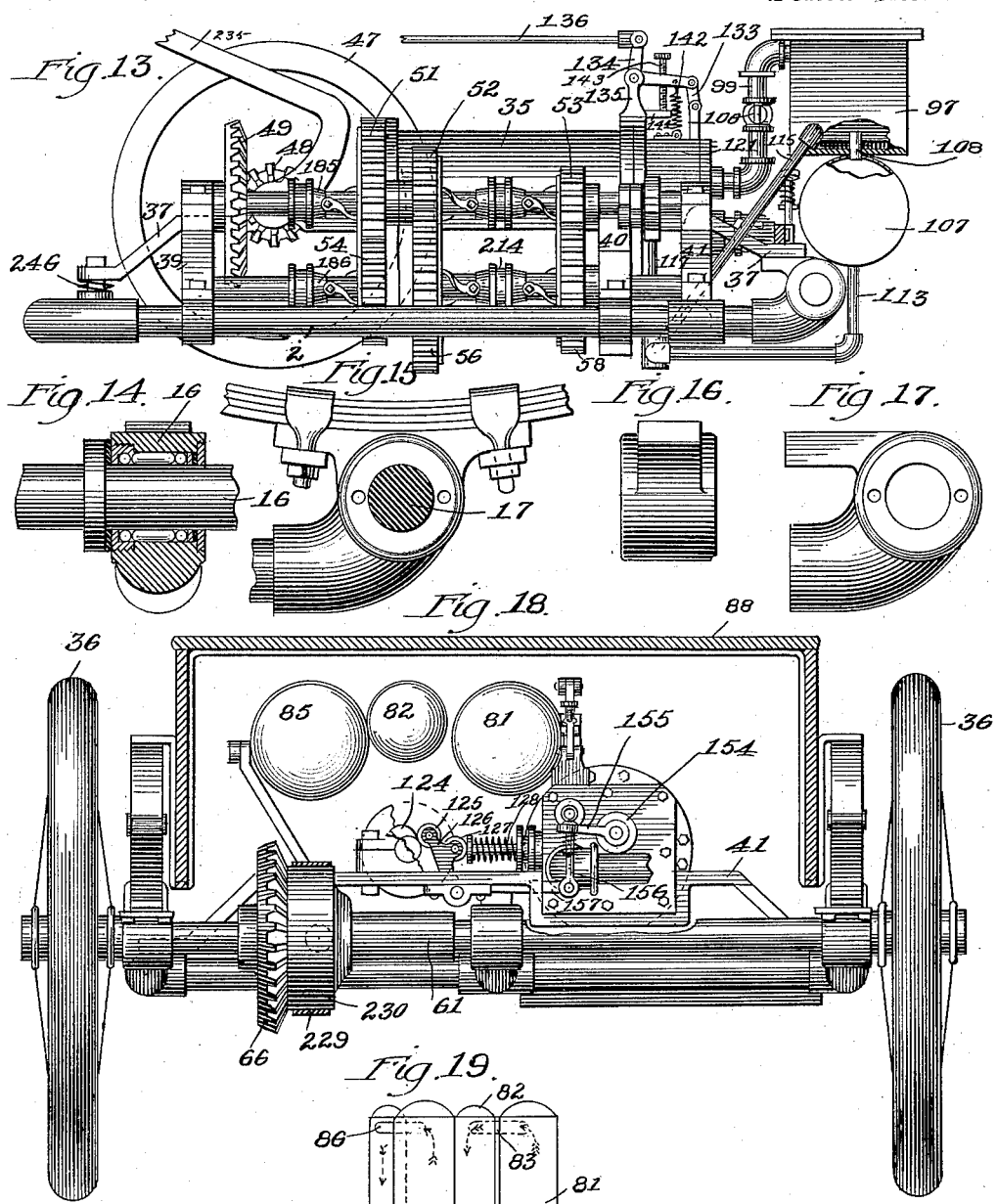

No. 686,099. Patented Nov. 5, 1901.
A. C. MATHER.
MOTOR ROAD VEHICLE.
(Application filed Nov. 28, 1899.)
(No Model.) 12 Sheets—Sheet 6.
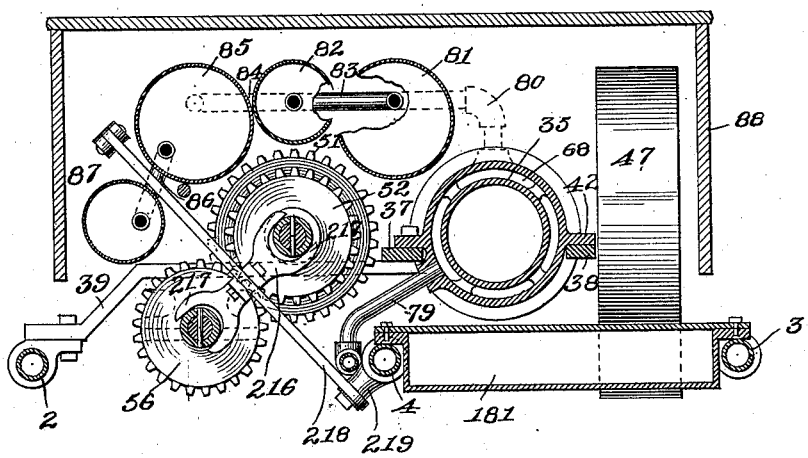
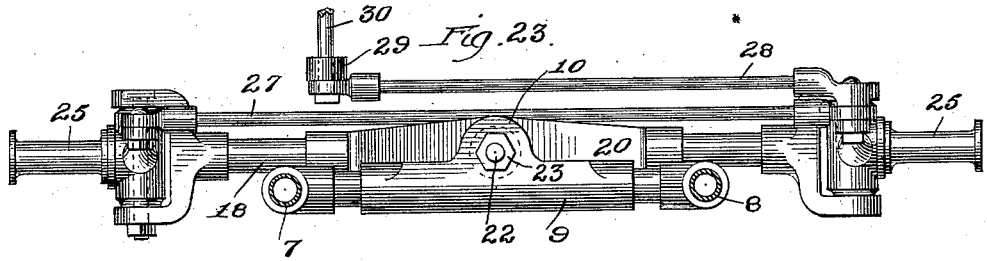
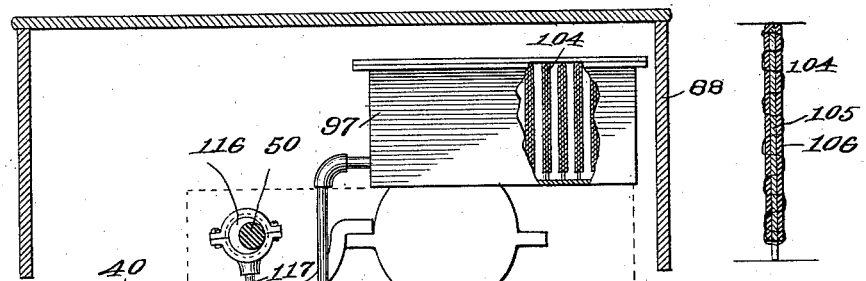
Witnesses: Inventor:
Frank S. Blanchard
James L. Norris
Alonzo C. Mather No. 686,099. Patented Nov. 5, 1901.
A. C. MATHER.
MOTOR ROAD VEHICLE.
(Application filed Nov. 28, 1899.)
(No Model.) 12 Sheets—Sheet 7.
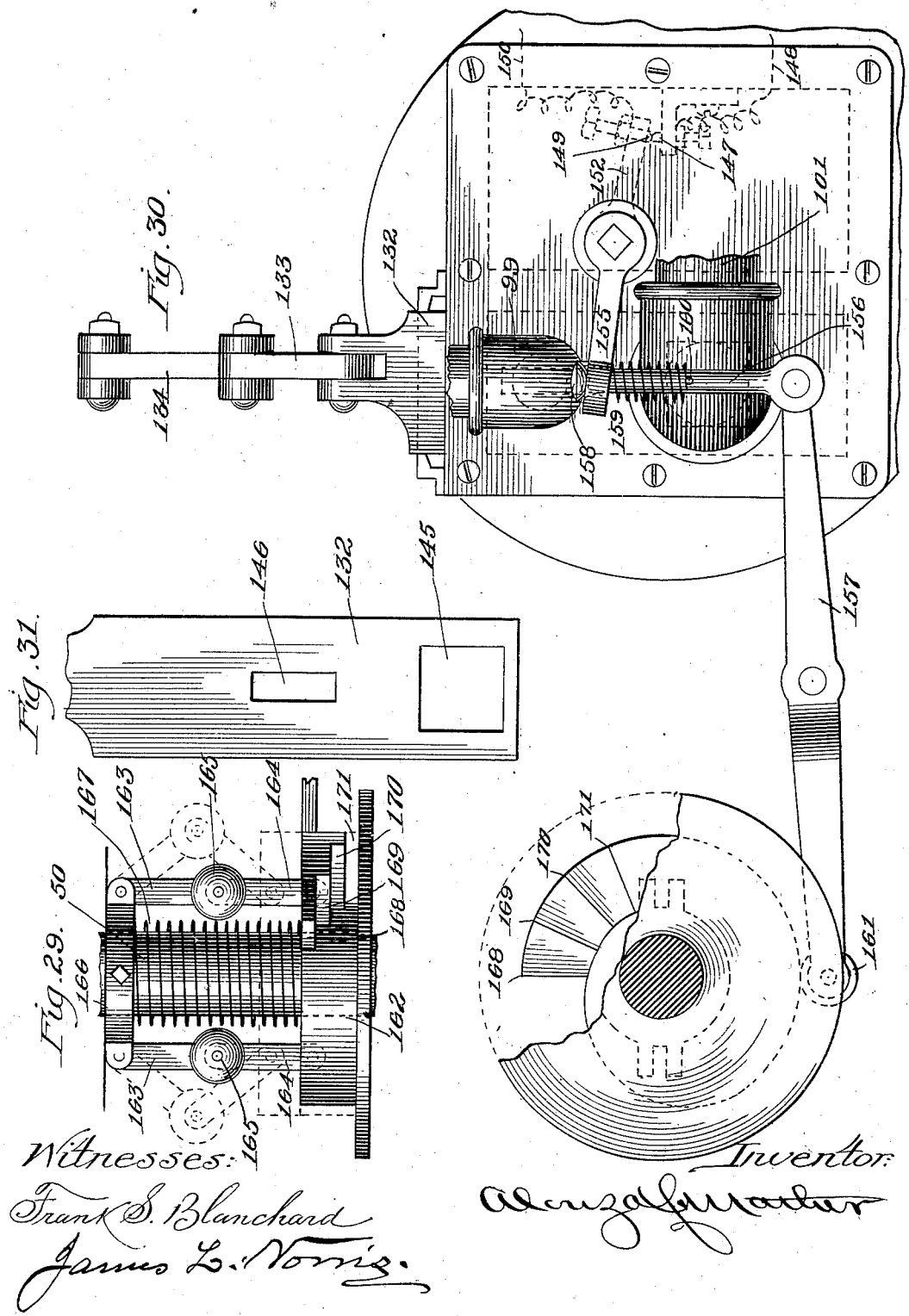
Witnesses:
Frank S. Blanchard
James L. Norris.
Inventor:
Alonzo C. Mather

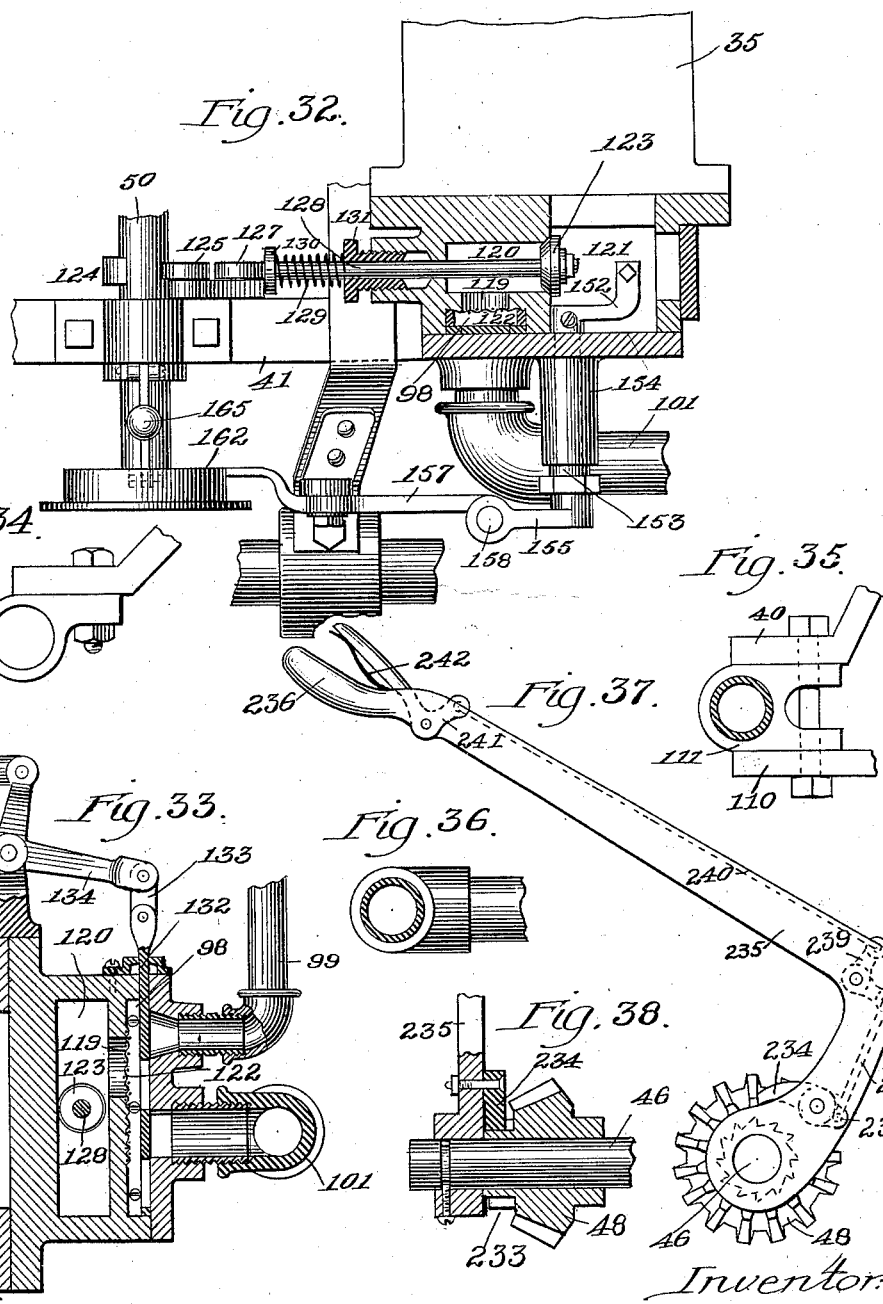

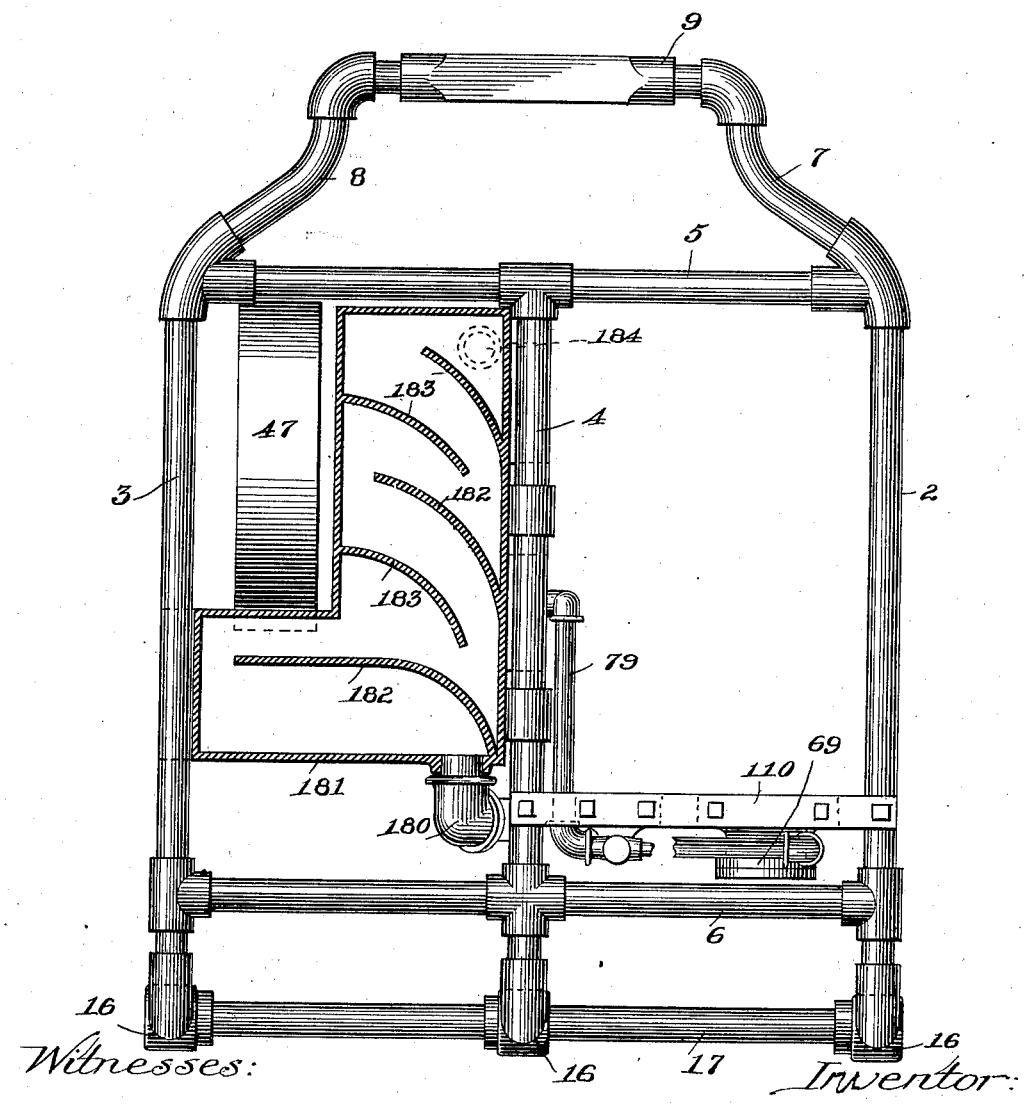

No. 686,099. Patented Nov. 5, 1901.
A. C. MATHER.
MOTOR ROAD VEHICLE.
(Application filed Nov. 28, 1899.)
(No Model.) 12 Sheets—Sheet 10.
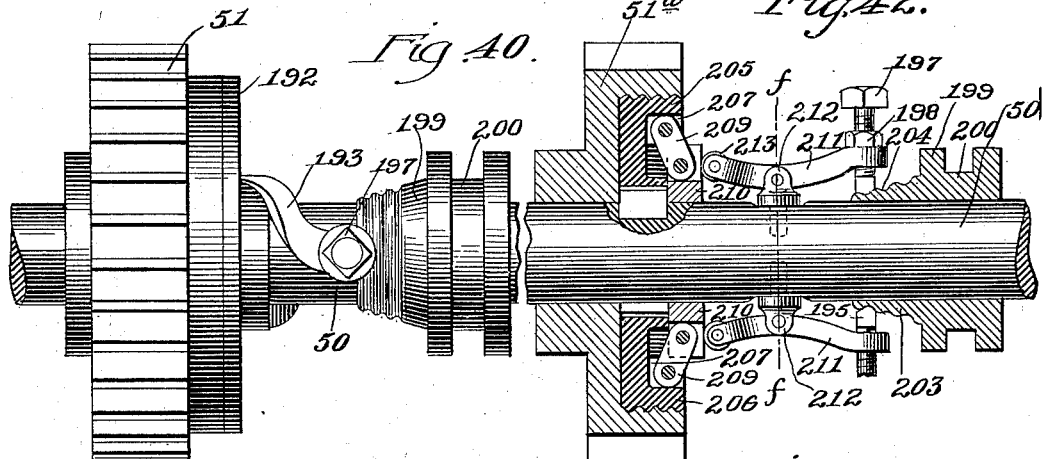
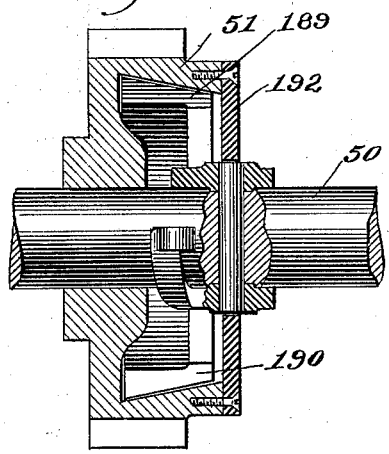
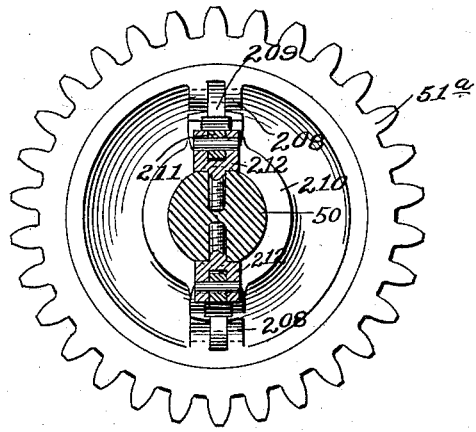
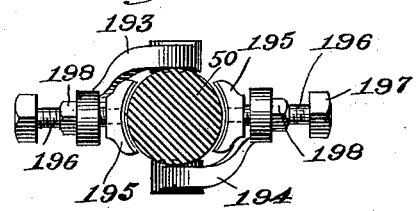
Witnesses: Frank S. Blanchard James L. Norris.
Inventor: Alonzo C. Mather No. 686,099. Patented Nov. 5, 1901.
A. C. MATHER.
MOTOR ROAD VEHICLE.
(Application filed Nov. 28, 1899.)
(No Model.) 12 Sheets—Sheet 11.
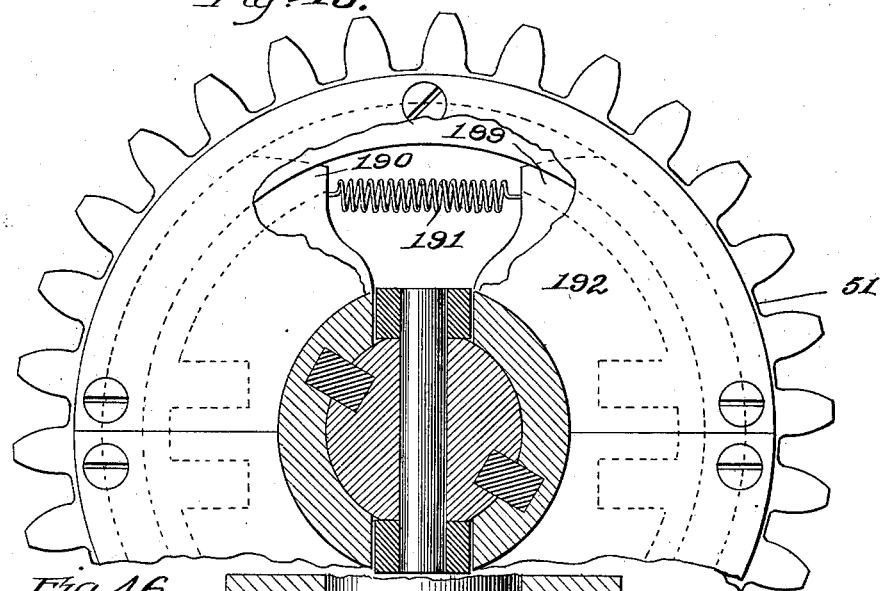
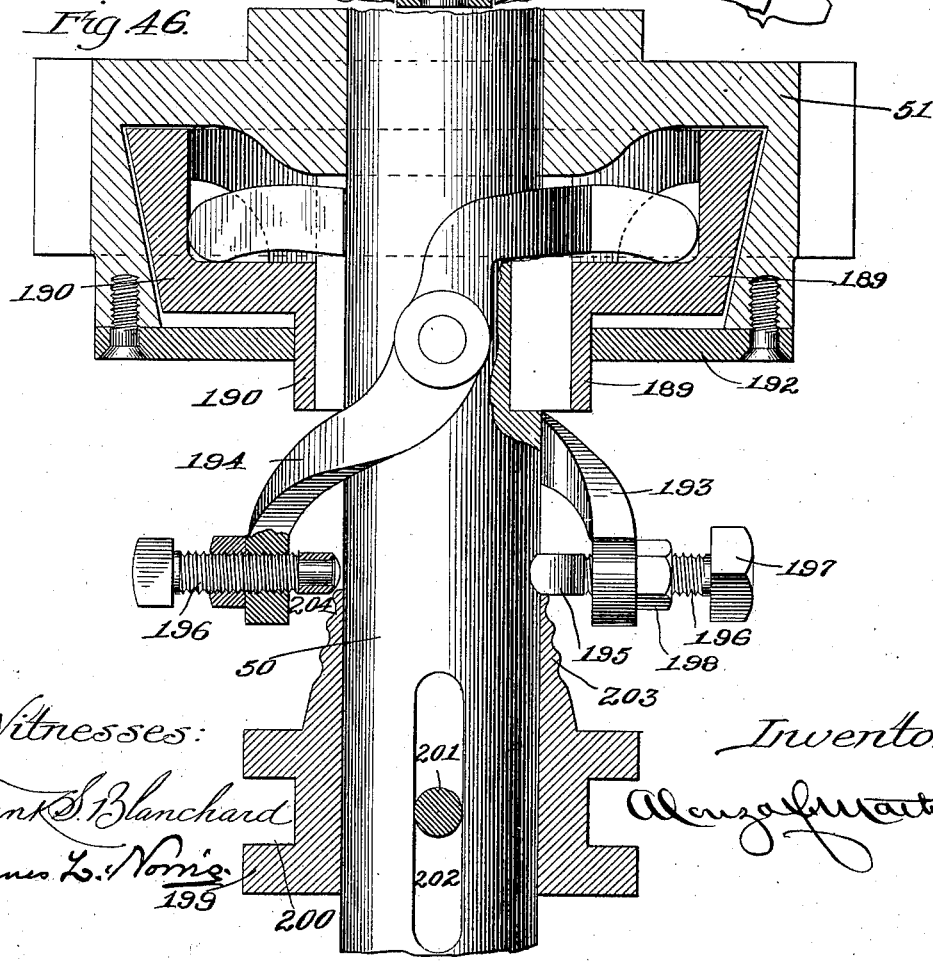
Witnesses: Inventor:

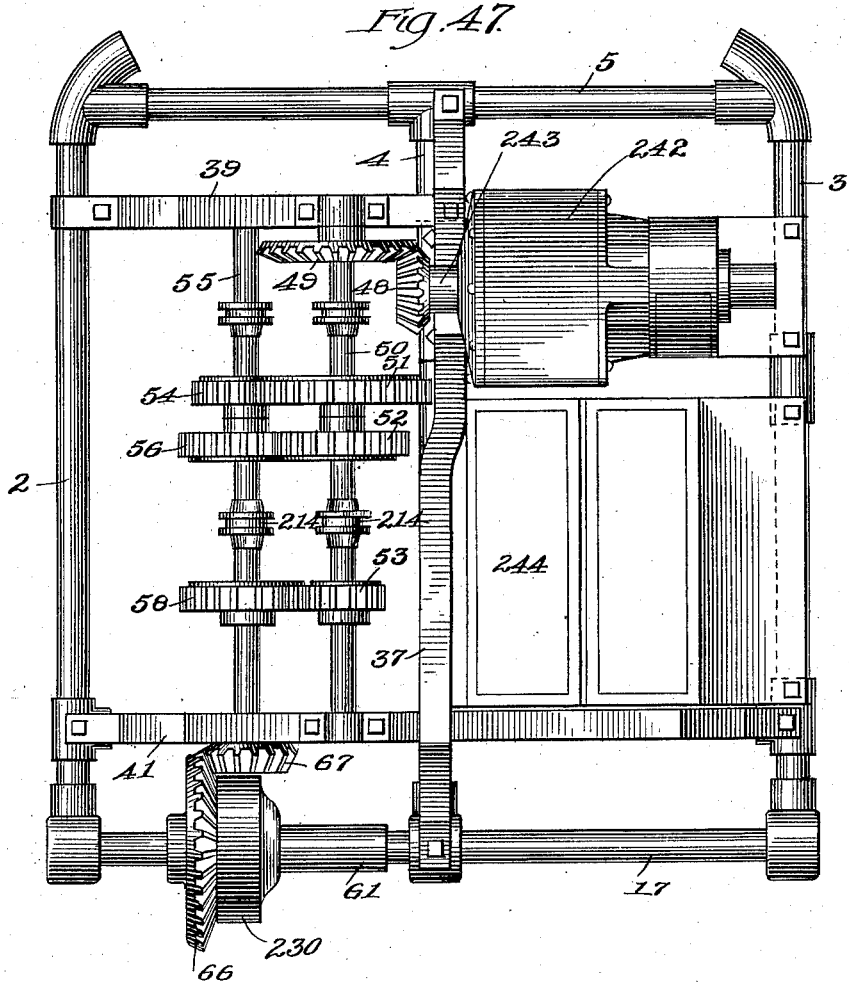

UNITED STATES PATENT OFFICE.

ALONZO C. MATHER, OF CHICAGO, ILLINOIS.

MOTOR ROAD-VEHICLE.

SPECIFICATION forming part of Letters Patent No. 686,099, dated November 5, 1901.

Application filed November 28, 1899. Serial No. 738,591. (No model.)

*To all whom it may concern:*

Be it known that I, ALONZO C. MATHER, a citizen of the United States, residing at Chicago, in the county of Cook and State of Illinois, have invented new and useful Improvements in Motor Road-Vehicles, of which the following is a specification.

My invention relates to motor road-vehicles, the object of the same being to simplify and otherwise improve the construction of this class of devices and to provide means whereby the operation thereof is facilitated.

The invention consists of the features and details of construction and combinations of parts, which will be hereinafter more fully described and claimed.

In the drawings forming part of this specification, Figure 1 is a front elevation of my improved motor-vehicle. Fig. 2 is a rear elevation. Fig. 3 is a side elevation. Fig. 4 is a plan view of the same. Fig. 5 is a horizontal sectional view through the side of the vehicle-body, showing the mechanism for ventilating the same. Fig. 6 is a detail perspective view of one of the pivotally-mounted wings or slats of the ventilating mechanism. Fig. 7 is a plan view of the main frame on which the operative parts are to be mounted. Fig. 8 is a plan view of the vehicle with the body and water-tanks removed, showing the engine-cylinder, the carbureter, and the differential gear on the rear axle in horizontal section. Fig. 9 is a vertical cross-section on the line $a\ a$ of Fig. 8. Fig. 10 is a detail sectional view of the water-circulating pump, the same being taken on the line $b\ b$ of Fig. 8. Fig. 11 is a side elevation of the pump looking to the left in Fig. 10. Fig. 12 is a similar view of the same with the head of the piston-cylinder removed. Fig. 13 is a side elevation looking to the right of Fig. 8, with certain parts removed to more clearly show the remaining parts. Fig. 14 is a detail sectional view of the roller-bearings in which the rear axle is mounted. Fig. 15 is a cross-sectional view through the rear axle, showing the frame-coupling on which the vehicle-body and supporting-springs are mounted. Figs. 16 and 17 are detail views in elevation of couplings for the frame in the center of the rear axle. Fig. 18 is a rear elevation with the carriage-body in section and certain parts removed to show the rear ends of the water-cylinders, the admission-valve and its operating mechanism, and the rear side of the mixing and explosion chambers. Fig. 19 is a detail plan view of the water-cylinders and engine-cylinder, showing diagrammatically the course of the water from the pump through the water-jacket of the engine-cylinder and its return. Fig. 20 is a vertical longitudinal sectional view through the steering-lever, the front platform, and the seat, with the engine and its coöperating mechanism removed and one of the water-cylinders in elevation. Fig. 21 is a side elevation looking to the left in Fig. 8, with certain parts removed and showing the body of the vehicle in longitudinal section. Fig. 22 is a vertical cross-section on the line $c\ c$ of Fig. 8. Fig. 23 is a section on the line $d\ d$ of Fig. 7. Fig. 24 is a section on the line $e\ e$ of Fig. 8, showing the casing of the carbureter partly broken away. Fig. 25 is a detail sectional view of one of the partitions of the carbureter. Fig. 26 is a detail plan view of a portion of Fig. 24. Fig. 27 is a detail front elevation of the connecting cross-bar at the front of the main frame. Fig. 28 is a rear elevation of the yoke on the front axle, through which said axle is pivoted to the main frame. Fig. 29 is a detail plan view of the governor which controls the cam for actuating the sparking mechanism. Fig. 30 is a rear elevation of the same, partly broken away, shown in connection with the rear side of the mixing and explosion chambers with the electrodes shown in dotted lines. Fig. 31 is a detail view in elevation of the slide for controlling the admission of hydrocarbon vapor and air to the mixing-chamber. Fig. 32 is a horizontal section through the mixing and explosion-chambers at the rear of the engine-cylinder, showing the parts coöperating therewith in plan. Fig. 33 is a vertical sectional view taken through the mixing-chamber, as shown in Fig. 32. Figs. 34 and 35 are detail views showing the coupling-pieces between the main frame and the truss-frame. Fig. 36 is a sectional elevation of one of the angle coupling-pieces. Fig. 37 is a detail view, in side elevation, of the starting-lever, showing its connection with the bevel-pinion on the crank-shaft, which is operated directly from the engine. Fig. 38 is a sectional view through the lower end of said lever and said pinion. Fig. 39 is a bottom plan view of the main frame, showing the muffler in section. Fig. 40 is a side elevation of one form of clutch which I employ. Fig. 41 is a longitudinal sectional view of the same. Fig. 42 is a longitudinal sectional view of another form of clutch. Fig. 43 is a cross-section of the same on the line $f\,f$ of Fig. 42. Fig. 44 is a detail sectional view showing the form of the adjustable shoes with which the sliding sleeve of the clutch engages. Fig. 45 is a cross-sectional view, on an enlarged scale, of the form of clutch shown in Figs. 40 and 41, the section being taken at right angles to Fig. 41 through the pin on which the operating-levers of the clutch are mounted. Fig. 46 is a longitudinal sectional view of the same, showing the shaft and the operating-levers in elevation; and Fig. 47 is a plan view of the main frame, showing the adaptation of an electric motor, steam-engine, or other power to the shafts through which motion is transmitted to the rear drive-axle.

Like reference-numerals indicate like parts in the different views.

In carrying out my invention I provide a main frame 1, on which the operative parts are mounted, the same being of peculiar construction to adapt it to properly support the parts which are mounted thereon, so as to economize space and to apply the weight equally and advantageously throughout. Said frame is made up of two outer longitudinal rods 2 3, an intermediate longitudinal rod 4, a cross-rod 5 at the front ends of the longitudinal rods, and a cross-rod 6, parallel to the rod 5 at or near the rear end of the frame, the said rods being coupled and bonded or tied together, as shown. In front of the cross-rod 5 the said longitudinal rods 2 and 3 are formed with extensions 7 and 8, respectively, which converge toward each other, so as to make the frame at its extreme front end narrower than it is at the rear and throughout the major portion of its length. The rods or extensions 7 and 8 are connected at their forward ends by a cross-rod 9, formed with an upwardly-extending lug or projection 10, having an opening 11 therein. The longitudinal rods 2, 3, and 4 are extended to the rear of the cross-rod 6, as shown at 12, 13, and 14, and are formed with bearings 16, in which the rear axle 17 is mounted. The coupling-pieces between the extensions 12, 13, and 14 and the form of roller-bearings employed are illustrated in detail in Figs. 14 and 15 of the drawings. The particular form of bearings employed forms no part of my present invention, and a detail description thereof need not therefore be entered into.

The front axle 18 has a yoke 19 secured thereto and extending rearwardly therefrom, the rear cross-bar 20 of said yoke being formed with an opening 21. Through the openings 21 in the cross-bar 20 and the opening 11 in the cross-bar 9 of the frame 1 passes a pivot-bolt 22, the said bolt also extending through the central portion of the axle 18 and being secured in place by nuts 23 23 at the opposite ends thereof. In the manner described the front axle 18 is pivoted to the main frame and is adapted to rock in a vertical plane independently of said frame, so as to accommodate itself to unevennesses in the road without racking or twisting said frame. The front wheels 24 of the vehicle are mounted on stub-axles 25, which are themselves pivoted to the main axle 18, so as to be turned for the purpose of steering the vehicle independently of said main axle. The said stub-axles have secured to them rearwardly-extending crank-arms 26 26, which are connected by a rod 27, so that the stub-axles carrying said wheels may be turned in unison. One of the crank-arms 26 is connected through a rod or pitman 28 with a crank 29, secured to the lower end of a steering-rod 30, said steering-rod extending upwardly through the front platform of the vehicle and provided with an operating-lever 31 within reach of the occupant of the vehicle, so that when said lever 31 is turned in one direction or the other the wheels 24 will likewise be turned in the same direction for the purpose of steering the vehicle. The lever 31 is pivoted to the upper end of the steering-rod 30, so that it may be thrown out of the way when it is desired to enter or alight from the vehicle. On the front platform 32 is secured a stuffing-box 33. Through this stuffing-box the steering-rod 30 passes, the same being surrounded by a gland 34, which may be screwed down into the stuffing-box 33 for the purpose of increasing the tension of the packing in said box on said steering-rod, as will be readily understood. This construction provides a tight bearing for the steering-rod 30 in its movements and prevents the vibration of said rod and the disagreeable noise and jar to the arm which is incident to such vibration.

I propose to propel my improved vehicle by means of an explosive-engine 35, transmitting the power from said engine through suitable gearing to the rear axle 17, on which the driving-wheels 36 are secured. The engine 35 is supported slightly above the plane of the main frame 1 on a truss-frame made up of longitudinal stringers 37 38, secured at one end to the cross-beam 5 of the main frame and at the other end upon the rear axle, the connection between said stringers and said rear axle being through couplings permitting of the rotation of said axle. The truss-frame is also made up of the stringers 39 40 41, extending at right angles to the stringers 37 and 38 and connected to the main frame and to the stringers 37 and 38, as shown. The engine 35 is formed with side flanges 42, through which and the stringers 37 38 securing-bolts 43 pass. The piston 44 on the engine 35 is connected through the pitman 45 with the crank-shaft 46, having a fly-wheel 47 on one end and a bevel-pinion 48 on the other end. The said crank-shaft constitutes the drive-shaft of the propelling mechanism and is mounted in suitable bearings, as shown, in the stringers 37 and 38. The pinion 48 meshes with a gear-wheel 49 on a primary counter-shaft 50, mounted in bearings on the stringers 39 and 41 and provided with a series of gears 51, 52, and 53, all of which are loose on said shaft, but are adapted to be coupled or locked therewith by means of clutch mechanism, to be described later. The gear 51 meshes with a gear 54 of smaller diameter on the secondary counter-shaft 55, the gear 52 meshes with a gear 56 on the shaft 55, and the gear 53 meshes with an idle gear 57, which in turn meshes with a gear 58 on the shaft 55. The gears 54, 56, and 58 are all loose on shaft 55, but are adapted to be coupled therewith by improved clutch mechanism, to be described later. The rear axle 17 is made in two parts 59 60, the part 60 having a sleeve 61 keyed thereto, which sleeve carries the bevel-pinion 62. The part 59 is secured to the bevel-pinion 63 of the same size and mesh as the pinion 62, and is extended loosely through the pinion 62 and into the sleeve 61. Meshing with the pinions 62 and 63 are pinions 64 65 of the same size, the same being located at right angles to the pinions 62 and 63 and loosely mounted in the bevel-gear 66. The pinions described and the bevel gear-wheel 66 constitute a differential gear, through which motion is transmitted from the shaft 55 to the rear axle 17, said differential gear providing for the movement of one part of said axle at a different speed from the other when the vehicle is turning. The connection between the shaft 55 and the differential gear referred to is effected by the pinion 67 on said shaft 55, which meshes with the bevel-gear 66. Surrounding the engine-cylinder 35 is a water-jacket 68, a circulation of water being maintained therein by a pump 69, supported upon a bracket on the stringer 40. The rotary piston 70 of said pump is operated from a pulley 71, connected to the outer end of a rotary piston-rod 72, the said pulley being driven from the primary intermediate shaft 50 through a cord or belt 73, which passes around the pulley 71 and a pulley 74 on said shaft 50. The piston 70 of the pump 69 rotates in the pump-cylinder, one end of which is closed by the cylinder-head 75. The said piston is provided with a series of curved spirally-arranged wings or blades 76, which when rotated in the direction of the arrow, Fig. 12, tend to discharge the water by centrifugal force through the port 77, leading from one side of the pump-cylinder. Water is admitted to the central part of the pump-cylinder through the pipe 78, the same communicating with one of a battery of water-tanks, which tanks are illustrated in detail in Fig. 19 of the drawings. From the port 77 of the pump 69 the water is forced through the pipe 79 to the water-jacket 68 at the extreme lower forward end of the engine-cylinder 35. Passing through the water-jacket 68 it leaves the same through the pipe 80, entering the tank or cylinder 81 near one end thereof. Passing through said tank to its opposite end it flows into tank or cylinder 82 through the pipe 83. It leaves the tank or cylinder 82 at the end opposite that at which it enters, passing through the pipe 84 into the third tank or cylinder 85. As before, it passes from one end of the tank or cylinder 85 to the opposite end thereof, and thence flows through the pipe 86 into the fourth and final tank or cylinder 87, flowing from the latter through the pipe 78 back into the pump. In this way a complete and continuous circulation of water is maintained in the water-jacket 68, surrounding the engine-cylinder.

The operative parts of the device which have been described, as well as those which are to be described later, are all inclosed by the body 88 of the vehicle. The said body forms a hood, beneath which the operative parts referred to are located and by means of which they are protected and shielded from outside conditions. As considerable heat is generated, however, within the body 88 about the engine and the other operative mechanisms, it is important to provide means for the ventilation thereof. I have provided certain mechanism for this purpose which is illustrated most clearly in Figs. 3, 5, and 6 of the drawings. Each of the sides of the body is provided with an opening 89, in which are pivoted a series of wings or slats 90. The pivotal connection between these slats and the sides of the body is effected by means of a rod or pin 91 on each slat, which fits within a corresponding socket in the body on each side of the opening 89. The inner edge of each slat 90 is formed with a tongue or projection 92, having an opening therein, through which passes an operating-rod 93, the said rod being provided with collars 94, which are located on each side of the tongues 92, so that when said rod 93 is moved longitudinally it will swing the wings 90 simultaneously to open or close the passage to the interior of the body 88. It will be observed, as illustrated in Fig. 5 of the drawings, that when the slats 90 are all in their closed positions they overlap each other and effect a complete closure of the passage 89. When the inner ends thereof, however, are moved forwardly, the outer ends thereof are turned rearwardly, so that openings for the passage of air to the interior of the body 88 are produced. In order to effect the simultaneous operation of the slats 90 and to maintain them in any position to which they may be adjusted, I swivel upon the forward end of the operating-rod 93 a screw 94, having a knob or handle 95 thereon within convenient reach of the operator, said screw passing through a threaded opening in a nut or plate 96, secured to the front end of the body 88. By this construction it will be observed that by turning the knob 95 in one direction or the other a longitudinal movement of the rod 93 in one direction or the other will be effected, which movement of said rod will be transmitted simultaneously to the wings or slats 90 in the manner hereinbefore described.

The engine 35 is supplied with hydrocarbon vapor from the carbureter 97, which communicates with the mixing-chamber 98 at the rear of the engine 35 through a pipe 99, provided with a valve 100, by means of which the supply may be controlled. An air-pipe 101, communicating with the atmosphere, also leads into said mixing-chamber below the point of connection of the pipe 99. The casing of the carbureter 97 is open to the atmosphere at one end through a pipe 102, having a cock or cut-off 103 therein. Inside the casing are arranged a series of diaphragms or partitions 104, extending alternately from opposite sides of the casing, so as to form a circuitous passage for the air from the inlet-pipe 102 to the discharge-pipe 99, and thereby insure the absorption of a sufficient amount of vapor from the gasolene contained in the carbureter-casing. Each of the diaphragms or partitions 104 is formed of a central metallic strip or plate 105 and a layer 106 of absorbent material on each side thereof. The said layers of absorbent material are sewed to the central metallic plate 105 and terminate, as shown in Figs. 24 and 25 of the drawings, a short distance above the lower end of said plate. Beneath the carbureter 97 is a tank 107 for liquid gasolene or other hydrocarbon. Gasolene from said tank is pumped up into the carbureter 97, and the same is maintained in the latter at the same level at all times by means of the short pipe 108, which extends a short distance above the bottom of the carbureter 97 and through which the gasolene from said carbureter is returned to said tank. The force-pump 109 (shown most clearly in Fig. 24 of the drawings) is supported upon the stringer or cross-beam 110, extending from the coupling 111 on the side bar 2 of the main frame to the coupling 112 on the central longitudinal bar 4 of said main frame. The pipe 113 leads from the hydrocarbon-tank 107 to the cylinder 114, and the pipe 115 leads from said cylinder to the carbureter 97. The pump is actuated from the eccentric 116 on the primary counter-shaft 50, which eccentric is coupled with a pitman 117, connected with a piston-rod 118. During the rotation of the shaft 50, which takes place when the engine is operated, the piston of the pump 109 is reciprocated and gasolene or other liquid hydrocarbon is pumped from the tank 107 to the carbureter 97 and is maintained in said carbureter at a certain level, which is just above the lower ends of the strips of absorbent material 106 on the diaphragms or partitions 104. The mixing-chamber 98 communicates through the port 119 with the valve-chamber 120, the latter communicates with the explosion-chamber 121, and the explosion-chamber communicates with the interior of the engine-cylinder 35. Over the port 119 is secured a sheet 122, of perforated sheet metal, wire-netting, or other reticulated material, for the purpose of preventing the flame from the explosion-chamber 121 from coming in contact with the mixed air and vapor in the mixing-chamber 98. An admission-valve 123 controls the passage into the explosion-chamber 121, the same being actuated from a cam 124 on the primary counter-shaft 50. The said cam engages a roller 125 on a lever 126, fulcrumed on the cross-stringer 41 and carrying a roller 127, which engages the rear end of the valve-stem 128. The said valve-stem is held normally in its outward position in engagement with the roller 127 by means of a spring 129, which acts at one end against the head 130 on said stem and at the other end upon a gland 131. It will thus be seen that during the rotation of the shaft 50 the admission-valve 123 will be alternately opened and closed with a rapidity proportionate to the speed of said shaft 50.

In order to control the admission of hydrocarbon vapor and air to the mixing-chamber 98, I have provided a vertically-movable slide-valve 132, which is movable in front of the openings leading from the pipes 99 and 101 to the chamber 98. The upper end of said slide is connected through a link 133 with one arm of a bell-crank lever 134, fulcrumed upon a bracket or standard 135 on the upper side of the engine 35. The other arm of said bell-crank lever is connected through a pitman 136 with one arm of a second bell-crank lever 137, fulcrumed upon a bracket 138, secured to the vehicle-body 88 near the front thereof. The other arm of the bell-crank lever 137 is connected through a link 139 with a foot-lever 140, adapted to engage one of a series of notches in a locking-segment 141 on the front platform of the vehicle. By this construction it will be seen that by depressing the foot-lever 140 the slide-valve 132 will be raised, and by elevating the foot-lever 140 the slide-valve 132 will be lowered. The same may also be locked in any position to which it may be moved by the engagement of the foot-lever 140 with one or the other of the notches or shoulders on the segment 141. When the foot-lever 140 is released, the slide-valve 132 is returned to its lowest position by means of a spring 142, secured to the upper side of the explosion-chamber 121 at one end and to the bell-crank lever 134 at its other end. Said slide is prevented from returning to its extreme lowermost position, however, by means of an adjustable stop 143, which engages a lateral extension 144 on the bracket or standard 135. Said adjustable stop has been shown in the form of a screw having a milled head extending through a threaded opening in one arm of the bell-crank lever 134. By means of this adjustable stop provision is made for the admission of a small amount of hydrocarbon vapor and air to the mixing-chamber even after the engine and the parts coöperating therewith are out of operation. The slide-valve 132 is provided with an opening 145 in its lower end and an opening 146 just above the opening 145. The opening 146 is of the same length as but narrower than the opening 145. The widths of these two openings are of the same ratio one to the other as the quantity of hydrocarbon vapor to be supplied is to the quantity of air. For example, if the volume of hydrocarbon vapor to be supplied to the mixing-chamber 98 is one-third of the volume of air to be supplied the width of the opening 146 will be one-third of that of the opening 145. When the slide-valve 132 is in its raised position, the opening 146 will register with the passage through which the pipe 99 discharges into the mixing-chamber 98 and the opening 145 will register with the passage through which the pipe 101 discharges into the chamber 98. The largest quantity of both hydrocarbon vapor and air will now be admitted. If it be desired to cut off the combined volume of hydrocarbon vapor and air according to the amount which the engine can use, it will be necessary merely to release the foot-lever 140 and lock it in a higher notch in the segment 141 than that with which it was formerly engaged. It will be evident that this will cause a downward movement of the slide-valve 132 and that a portion of the passages through which the pipes 99 and 101 enter the mixing-chamber 98 will be closed. As openings 146 and 145, however, are proportionate in width to the ratio which is to be maintained between the volume of hydrocarbon vapor and air, it will be evident that although the combined volume of hydrocarbon vapor and air is decreased the proportions of the two ingredients in the reduced volume will be maintained. This adjustment and regulation of the feed of the fuel to the combustion-chamber may, as will be observed, be readily effected by a simple motion of the foot from the vehicle-seat.

After a charge of hydrocarbon vapor mixed with air has been admitted to the explosion-chamber 121 through the actuation of the inlet-valve 123 means must be provided for igniting said vapor and causing the explosion thereof. The means employed by me consists of a stationary electrode 147, which constitutes one terminal of an electric circuit through the wire 148, and a movable electrode 149, which constitutes the other terminal of the circuit through the wire 150. When the electrodes 147 and 149 are in contact with each other, as shown in Fig. 30 of the drawings, the circuit from the generator or battery 151 will be closed. When, however, the electrode 149 is moved away from the electrode 147, the jumping of the circuit from one electrode to the other will create a spark which will be sufficient to ignite the explosive charge in the chamber 121. The movable electrode 149 is carried by a curved arm 152, secured to a rotary shaft 153, mounted to turn in a bearing-sleeve 154, extending outwardly from the rear wall of the explosion-chamber 121. The outer end of the shaft 153 carries a crank-arm 155, having an opening near its free end, through which passes loosely a rod 156, pivoted at its lower end to a lever 157, fulcrumed at a point intermediate its ends. The rod 156 has a knob or head 158 on its upper end, which is larger than the opening in the free end of the crank-arm 155 and is adapted to engage and move said crank-arm and the electrode 149, connected therewith, when the lever 157 is moved, so that that end thereof with which the rod 156 is connected is depressed. A spring 159 engages a pin 160 on the rod 156 and also engages the crank-arm 155, the said spring tending normally to create a gentle contact between the electrodes 149 and 147. The end of the lever 157 opposite the pivotal point of the rod 156 carries a roller 161, which engages the periphery of a rotary cam 162, loosely mounted on the shaft 50. The cam 162 is capable of longitudinal movement on the shaft 50, and its position on said shaft is controlled by a governor made up of the links 163 and 164 and the balls or weights 165, pivoted to the adjacent ends of said links. The links 163 are pivoted to the collar 166, secured to the shaft 50, and the links 164 are pivoted to the cam 162. The said cam is normally held in the position shown in Fig. 29—that is, away from the collar 166—by means of a coil-spring 167. As the speed of rotation of the shaft 50 increases the balls or weights 165 will be thrown outwardly by centrifugal force and the cam 162 will be drawn up toward the collar 166, as shown in dotted lines in Fig. 29. The degree of inward movement of said cam will be proportionate to the speed at which the shaft 50 is rotated. As soon as the speed of said shaft decreases, said cam will be urged outwardly away from the collar 166 by means of the spring 167. The surface of the cam 162 is formed with a series of drops or steps 168, 169, 170, and 171, the drop 168 being arranged adjacent to the inner face of the cam, the drop 171 being arranged adjacent to the outer face of said cam, and the drops 169 and 170 being arranged between the inner and outer drops. It will thus be seen that each of said drops is in a different plane and each succeeding drop is a short distance behind that which is nearer the inner face of the cam. As heretofore stated, the roller 161 on one end of the lever 157 is engaged by the cam 162 during the rotation of the latter. When the engine first starts up or when it is running at a very slow speed, the roller 161 will be engaged by that part of the cam 162 which is nearest the inner face of said cam. Consequently once in each revolution the drop 168 will come opposite the roller 161. Through the weight of the inner end of the lever 157 and the rod 156, connected thereto, the end of the lever 157 which carries the roller 161 will be thrown upwardly and the opposite end of said lever will fall. During this movement the head or knob 158 on the rod 156 will be brought into said engagement with the crank-arm 155 and the shaft 153 will be rocked in its bearing, raising the arm 152 and separating the electrode 149 from the electrode 147. A spark will be thereby produced, which will cause an explosion of the mixed vapor and air in the explosion-chamber 121. The actuation of the inlet-valve and the actuation of the sparking device being both effected through the shaft 50, it will be a simple matter to adjust the cams on the shaft 50 to operate the admission-valve 123 and the sparking device at proper times, for no matter what the speed of the shaft 50 may be the relative times of operating these two mechanisms will be maintained. As the speed increases, however, the actual time at which the sparking device will be actuated after the actuation of the admission-valve will decrease. In order to provide for this contingency, it is necessary for the sparking device to be operated a little quicker as the speed of the engine increases. This is effected automatically by means of the cam 162 and the governor which controls the movements of the cam—that is to say, if the speed of the shaft 50, which is driven directly from the engine, is increased the cam 162 will be drawn upwardly toward the collar 166, so as to cause the roller 161 to be engaged by that part of the cam 162 in which the drop 169 is located. As the drop 169, however, is located slightly in advance of the drop 168, the lever 157, carrying the roller 161, will be actuated a little ahead of the time which it would have been actuated had the drop 168 extended entirely across the cam 162 or had no provision for the longitudinal movement of the cam 162 been made. As the speed of rotation of the shaft 50 increases still more that part of the cam in which the drop 170 is located will be thrown into operation and the actuation of the sparking device will be put ahead slightly in actual time. The exhaust from the engine 35 is controlled by a valve 172, which is operated automatically by a cam 173 on the shaft 50. The said cam engages a roller 174 on the upper end of the lever 175, fulcrumed on the under side of the stringer 40 and carrying a roller 176 at its lower end, which engages a head 177 on the end of the stem 178 of the valve 172. As the upper end of the lever 175 is thrown outwardly the lower end of said lever is thrown inwardly, which action operates to open the valve 172. The said valve is normally maintained in its closed position by means of a spring 179, said spring engaging the head 177 at one end and a gland through which the valve-stem 178 passes at the other end. The exhaust-passage 180, which is controlled by the valve 172, communicates with a muffler 181, as shown in Figs. 9 and 39 in the drawings. The said muffler is provided for the purpose of destroying the sound which is produced by the escaping gases and consists of a closed case having a series of wings 182 183 therein. The said wings are attached alternately to opposite sides of the muffler-casing and serve to deflect the escaping gases first in one direction and then in the other, allowing them to completely expand and partially condense before they are finally discharged through the passage 184.

The gears 51 and 54, 52 and 56, and 53 and 58, as heretofore stated, are loose upon the shafts 50 and 55, respectively. The gears 51 and 54 are adapted to be locked to the shafts on which they are mounted by means of clutches 185 and 186, and the gears 52 and 56 and 53 and 58 are adapted to be locked to the shafts on which they are respectively mounted by means of the double clutches 187 and 188. It is the common practice when a series of gears are mounted on two different shafts, one set of which is intended to be thrown into operation at a time, to secure one member of a set to one shaft, to mount the other member of the set loosely on the other shaft, and to provide a single clutch for locking the loose gear to the shaft on which it is mounted. The objection to this construction is that those gears which are not in operative connection with each other will run idly and produce a rattle and cause wear. To overcome this, I mount all of the gears loosely on their respective shafts and provide two clutches, one for each member of the set of gears, so that when said clutches are out of engagement with said gears the latter will remain stationary and the shafts on which they are mounted rotate independently thereof. I also provide means for operating the clutches in pairs simultaneously. The particular form of clutch employed by me is illustrated in detail in Figs. 40, 41, 44, 45, and 46, the same being shown mounted on the shaft 50, although exactly the same form of clutch is on the shaft 55. The gear 51, which is the one illustrated in the figures referred to, is formed hollow, and in the concavity thereof are mounted a plurality of clutch members 189 190, the same being keyed to the shaft 50, so as to rotate therewith, but capable of longitudinal and outward movement on said shaft. The same are maintained normally in their inward positions by means of springs 191 and are held within the cavity in the gear 51 by means of a plate 192, secured to the gear 51 by screws or other analogous devices. These clutch members are operated by means of curved levers 193 194, fulcrumed at a point intermediate their ends to the shaft 50 and constructed and arranged when their ends are thrown outwardly to force the clutch members 189 and 190 outwardly and rearwardly into engagement with the inner wall of the cavity in the gear 51 and in engagement with the inner surface of the plate 192.

The rear or free ends of the levers 193 and 194 are provided with inwardly-extending shoes 195, the same having concave inner surfaces and mounted upon adjustable supports 196. The particular form of support shown by me consists of a screw having a rectangular head 197 and provided with a lock-nut 198, by means of which it may be adjusted and secured in adjusted position. Coöperating with these levers and adapted to engage the shoes 195, which are located on diametrically opposite sides of the shaft 50, is a sliding collar 199, the same being formed with an annular groove or recess 200. The said sleeve is attached to the shaft 50 by means of a transverse pin 201, which extends through an elongated slot 202 in the shaft 50. This construction provides for a limited degree of longitudinal movement of the sleeve 199 and for the rotation of said sleeve with the shaft 50. The forward end of the sleeve 199, or that end which lies adjacent to the shoes 195, is tapering or wedge-shaped, as shown at 203, and is formed with stepped corrugations 204. By the construction described it will be seen that if the sleeve 199 be moved toward the levers 193 and 194 the tapering end 203 thereof will slide beneath the shoes 195 and cause the rear or free ends of the levers 193 and 194 to be spread or moved outwardly. A corresponding movement of the opposite ends of said levers will be likewise effected, with the result that the clutch members 189 and 190 will be thrown outwardly and rearwardly into engagement with the gear 51 and the plate 192. The inner surface of the shoes 195 being longitudinally concave and transversely convex, as shown in Figs. 44 and 46, when the sleeve 199 has been moved a certain degree said shoes will rest and be held in one of the corrugations 204. If it be found that the engagement between the clutch members referred to and the gear 51 and plate 192 is not sufficiently close to effectually lock said gear to the shaft 50, it is merely necessary to move the sleeve 199 a little farther forward, so as to cause the shoes 195 to engage and lie within the next higher corrugation 204. This insufficient engagement between said clutch members and said gear may be caused by lack of proper adjustment of the screws 196, which carry the shoes 195, or may be due to the wear of some of the coöperating parts. Whatever the cause, however, the same may be readily compensated for by the additional movement of the sleeve 199, as described.

An alternative form of clutch and one which I prefer to use is illustrated in Figs. 42 and 43. In this form of clutch, as in the one just described, a cavity is formed in the gear 51ª, and the clutch members 205 and 206 are keyed to the shaft 50 so as to be capable of longitudinal movement as well as outward movement thereon. The outer surface of the clutch members 205 and 206 and the inner side wall of the cavity in the gear 51ª are corrugated for the purpose of obtaining closer contact between these parts when said clutch members are thrown outwardly. The said clutch members are themselves hollowed out at the rear, as shown at 207, and are formed with ears 208, to which are pivoted the links 209. The said links are pivoted at their opposite ends to a sliding collar 210 on shaft 50. The said collar is adapted to be moved forwardly by means of levers 211, fulcrumed upon brackets or standards 212, secured to the shaft 50. The forward ends of said levers carry rollers 213, which engage the rear side of the collar 210, and the opposite ends of said levers carry shoes 195, similar in all respects to those heretofore described and mounted in the same manner. The levers 211 are actuated by the movement of the sleeve 199, similar to that heretofore described. When said sleeve is moved inwardly, the outer or free ends of the levers 211 are thrown outwardly, causing the rollers 213 on the opposite ends of said levers to be forced into contact with the collar 210 to move the latter forwardly. The forward movement of said collar causes, through the links 209, a forward and outward movement of the clutch members 205 and 206, forcing the latter into engagement with the bottom and side walls of the cavity in the gear 51ª.

The double clutches 187 and 188, heretofore referred to, are practically two separate clutches, except that they are operated by a single sleeve 214, similar in all respects to the sleeve 199, except that both ends thereof instead of one end are provided with tapering or wedge-shaped extensions having the stepped corrugations 204 thereon.

In order to provide for the simultaneous operation of the different sets of clutches, the sleeves 199, forming parts of the clutches 185 and 186, are connected together by a spanner 215, and the sleeves 214, forming part of the double clutches 187 and 188, are connected together by a spanner 216. These spanners are identical, and the latter is illustrated in detail in Fig. 22 of the drawings. Each spanner consists of a bar having forked or bifurcated ends 217, the branches of which ends fit within the groove 200 of the two sleeves with which it is connected, so that when said spanner is moved in the direction of the length of the shafts 50 and 55 they will simultaneously move the clutch-sleeves in the same direction. The spanner 216 is connected to a lever 218, fulcrumed at its lower end to a bracket 219 on the rod 4 of the main frame, and said lever is connected at its opposite end through a pitman 220 with an operating-lever 221, fulcrumed at its lower end upon the footboard 32 and extending up toward the seat 222 adjacent to the operator. The lever 221 therefore controls the sleeves 214, by which the double clutches 187 and 188 are operated. The spanner 215 is connected to a lever 223, fulcrumed at its lower end to a bracket or extension 224 on the central rod 4 of the main frame, and the lever 223 is connected at its upper end through a pitman 225 with an operating-lever 226, fulcrumed to the footboard 32 adjacent to the lever 221. The pitman 225 extends rearwardly from the point of attachment of the lever 223 therewith and is pivoted to a brake-lever 227, fulcrumed at its lower end to a bracket 228, secured to the cross-bar 6 of the main frame and having attached to it at a point intermediate its ends the free end of a brake-strap 229. The brake-strap 229 is secured at its opposite end to the bracket 228 and passes around the cylindrical portion 230 of the bevel-gear 66, through which power is transmitted to the rear axle 17. The connection between the brake-lever 227 and the pitman 225 is through a pin 231 and a slot 232, so that provision is made for a small degree of lost motion between these parts.

From the foregoing description it will be seen that when the lever 221 is moved forwardly by the operator the sleeves 214 will be simultaneously moved forward on the shafts 50 and 55, respectively. This movement of said sleeves will simultaneously throw into operation the clutches which control the gears 52 and 56 and throw out of operation the clutches which control the gears 53 and 58. Power is then transmitted from the shaft 50 to the shaft 55 through the gears 52 and 56. This will be the position of the parts when the vehicle is to be propelled at slow or moderate speed. When it is desired to reverse or back the vehicle, the lever 221 is forced rearwardly, this action, through the connections described, moving the sleeves 214 rearwardly, throwing out of operation the clutches which control the gears 52 and 56 and throwing into operation the clutches which control the gears 53 and 58. In this position of the parts power is transmitted from the shaft 50 to the shaft 55 through the gears 53, 57, and 58, the result being that the vehicle is propelled rearwardly. If it be desired to propel the vehicle at full speed, the lever 221 is moved so as to shift the sleeves 214 into an intermediate position between the clutches controlling the gears 52 and 56 and those controlling the gears 53 and 58, so that said gears will be idle or out of operation. At the same time the lever 226 is moved rearwardly, causing the simultaneous rearward movement of the sleeves 199, which control the clutches 185 and 186. This action will throw the gears 51 and 54 into operation and power will be transmitted from the shaft 50 to the shaft 55 through said gears 51 and 54. When it is desired to apply the brake, the lever 226 is forced forwardly, which action, through the pitman 225 and the brake-lever 227, causes the brake-strap 229 to be brought into frictional engagement with the cylindrical portion 230 of the bevel-gear 66.

When the engine has been at rest and the cylinder and explosion-chamber 121 are emptied, it is necessary to provide some means for securing a charge of hydrocarbon vapor and air to the explosion-chamber for operating the engine. To accomplish this, I provide for the reciprocation of the piston 44 by hand, so that a charge of combustible material may be drawn by suction from the carbureter 97. The bevel-pinion 48 is formed on one side with ratchet-teeth 233, adapted to be engaged by a pawl 234, pivotally mounted on the operating-lever 235, loosely mounted upon an extension of the crank-shaft 46. The lever 235 extends up to a point adjacent to the seat 222 on the vehicle, and the handle 236 thereof lies next to the lever 226. The pawl 234 has a lug or projection 237 on the end opposite its engaging point, which lug is connected through a rod or wire 238 with one arm of a bell-crank lever 239, fulcrumed on the lever 235. The other arm of said bell-crank lever is connected through a rod or wire 240 with a bell-crank gripping-lever 241, fulcrumed to the lever 235 adjacent to the handle 236. The free end of the lever 241 lies directly opposite the handle 236 and is held normally away from said handle by means of a spring 242. It will be seen that by compressing the lever 241, so as to bring its free end or gripping portion toward the handle 236 of the lever 235 the pawl 234 will be thrown into engagement with the ratchet-teeth 233 on the pinion 48. A forward movement being now imparted to the lever 235 will cause a rotation of the rock-shaft 46 and a consequent operation of the piston 44. The rearward movement of the lever 235 will impart no movement to the shaft 46 as the pawl 234 will slip over the ratchet-teeth 233. By continuing the rocking movement of the lever 235, and thereby continuing the reciprocation of the piston 44, a charge of compressible material will be drawn by suction into the explosion-chamber 121. By this time the igniting device will have been thrown into operation, and the further operation of the engine will be automatic.

In Fig. 47 of the drawings I have illustrated the same means of transmitting power from the motor to the rear axle 17 that is illustrated in the remaining figures. Instead of the engine 35, however, I employ an electric motor 242, the armature-shaft 243 of which corresponds to the crank-shaft 46 and carries upon its end the pinion 48, as before. The motor 242 is supplied with current in any suitable way from a battery or generator inclosed within the casing 244.

In Fig. 8 of the drawings I have shown the upper or forward end of the engine-cylinder 35 inclosed by a hood 245, in which the pitman 45 and the crank-shaft 46 work. The said hood serves as a dust-guard and also prevents dangerous contact with the moving parts of the engine.

The longitudinal stringers 37 and 38 of the truss-frame which support the engine 35 are supported upon springs 246, located between the ends of said stringers and the bars of the main frame 1, to which said stringers are connected. Said springs are preferably spiral springs surrounding the bolt by which the stringers referred to are connected to the frame.

The crank-shaft 46 is provided with extensions 247 opposite the crank-arms thereon, the said extensions serving to counterbalance the weight of said crank-arms to cause an even and regular rotation of said shaft and to avoid the vibration thereof.

Having now described my invention, what I claim as new, and desire to secure by Letters Patent, is—

1. In a motor road-vehicle, the combination of a motor, a driving-axle, and means for transmitting power from said motor to said driving-axle, the same including a primary and a secondary counter-shaft, the latter of which is geared to said axle, intermeshing gears loosely mounted on said shafts, clutches for coupling said gears to said shafts, a spanner connecting the sliding sleeves of said clutches, a lever fulcrumed at one end to a stationary part and connected at an intermediate point to said spanner, a brake, an operating-lever, a pitman connecting said operating-lever with the free end of the lever which is attached to said spanner, and connections between said operating-lever and said brake whereby said clutches may be simultaneously thrown into or out of operation and the brake released, and out of operation and the brake applied.

2. In a motor road-vehicle, the combination of an engine, a driving-axle, and means for transmitting power from said engine to said driving-axle, the same including a primary and a secondary counter-shaft, the latter of which is geared to said axle, intermeshing gears loosely mounted on said shafts, clutches for coupling said gears to said shafts, a brake acting upon said driving-axle, a brake-lever therefor, and an operating-lever connected with said clutches and with said brake-lever, whereby upon the movement of the same in one direction said clutches will be thrown into operation and said brake out of operation, and upon the movement of the same in the other direction said clutches will be released and said brake will be thrown into operative position.

3. In a motor road-vehicle, the combination of an engine, a driving-axle, and means for transmitting power from said engine to said driving-axle, the same including a primary and a secondary counter-shaft, the latter of which is geared to said axle, intermeshing gears loosely mounted on said shafts, clutches for coupling said gears to said shafts, a strap-brake acting upon said driving-axle, a brake-lever connected to the free end of said brake, a clutch-actuating lever, an operating-lever and a pitman connecting said clutch-actuating lever and said brake-lever with said operating-lever, whereby upon the movement of said operating-lever in one direction, said clutches will be thrown into operation and said brake will be thrown out of operation, and upon the movement of said operating-lever in the other direction said clutches will be thrown out of operation and said brake into operation.

4. In a motor road-vehicle, the combination of an engine, a driving-axle, and means for transmitting power from said engine to said driving-axle, the same including a primary and a secondary counter-shaft, the latter of which is geared to said axle, a plurality of pairs of intermeshing gears loosely mounted on said shafts, clutches for coupling said gears in pairs to said shafts, the same including slidingly-mounted sleeves on said shafts, one sleeve being common to each two clutches on the same shaft, and means for actuating said sleeves simultaneously, whereby upon the movement of said sleeves in one direction one set of clutches will be actuated and one set of gears will be coupled to said shaft and upon the movement of said sleeves in the other direction, the other set of clutches will be actuated and the other set of gears will be coupled to said shafts.

5. In a motor road-vehicle, the combination with the main frame on which the propelling mechanism is mounted, a front axle connected thereto, and pivotally-mounted steering-wheels on said front axle connected together so as to be operated in unison, of a steering-rod for turning said wheels, and a stuffing-box through which said steering-rod passes, the same comprising a case, packing material therein, and an adjustable gland for compressing said packing material, as and for the purpose set forth.

In testimony whereof I have hereunto set my hand in presence of two subscribing witnesses.

ALONZO C. MATHER.

Witnesses:
  CLAUD MCKAIN,
  GEO. E. EAGLE.